United States Patent [19]

Noguchi

[11] Patent Number: 4,926,651

[45] Date of Patent: May 22, 1990

[54] CONTROL APPARATUS FOR AUTOMOBILE AIR-CONDITIONERS

[75] Inventor: Ichiro Noguchi, Konan, Japan

[73] Assignee: Diesel Kiki Co., Ltd., Tokyo, Japan

[21] Appl. No.: 334,881

[22] Filed: Mar. 30, 1989

[30] Foreign Application Priority Data

Apr. 13, 1988 [JP] Japan .................. 62-49495[U]

[51] Int. Cl.$^5$ .................. F25B 27/00; F02M 3/06
[52] U.S. Cl. .................. 62/133; 62/158; 62/228.5; 62/243; 62/323.1; 123/339
[58] Field of Search .................. 62/133, 158, 228.3, 62/228.4, 228.5, 243, 323.1; 123/339, 340

[56] References Cited

U.S. PATENT DOCUMENTS

| | | | |
|---|---|---|---|
| 4,346,686 | 8/1982 | Wakita et al. | 62/323.1 X |
| 4,480,443 | 11/1984 | Nishi et al. | 62/158 X |
| 4,488,411 | 12/1984 | Hara | 62/133 |
| 4,836,164 | 6/1989 | Morozumi et al. | 123/339 |

*Primary Examiner*—Harry B. Tanner
*Attorney, Agent, or Firm*—Wenderoth, Lind & Ponack

[57] ABSTRACT

In a control apparatus for automobile air-conditioners including a variable displacement compressor and a fast idling device, the operation of the fast idling device is retarded until a predetermined discharge pressure of the variable displacement compressor is detected by a pressure sensor. With this retarded operation, it is possible to prevent the engine from rotating at an undue speed when the engine is operating under the fast idling mode.

3 Claims, 1 Drawing Sheet

CONTROL APPARATUS FOR AUTOMOBILE AIR-CONDITIONERS

BACKGROUND OF THE INVENTION

1. Field of the Invention:

The present invention relates to a control apparatus for an automobile air-conditioner driven by an engine and including a fast idling device for increasing the idling engine speed by a predetermined value when the air-conditioner is started.

2. Description of the Prior Art:

It is widely known that a motor vehicle having an air-conditioner driven by an engine of the vehicle is equipped with a fast idling device for increasing the idling engine speed to an extent corresponding to an increase in load offered to the engine by a compressor of the air-conditioner.

In view of a demand for power saving, for example, the compressors used in recent years generally comprise a variable displacement compressor. Owing to its peculiar features in construction and control performance, the variable displacement compressor is controlled in such a manner that the displacement is gradually increased after the compressor is started. Even in an air-conditioner having such variable displacement compressor, the aforesaid fast idling device is incorporated.

The fast idling device is activated when an air-conditioner start switch is turned on, whereupon the idling engine speed (e.g. 700 r.p.m.) is unconditionally increased by about 200 r.p.m. so as to accommodate the load on the compressor.

As described above, since the displacement of the variable displacement compressor is so controlled as to increase gradually after the start of the compressor, the engine load does not increase steeply in immediate response to the actuation of the air-conditioner start switch. Rather, the engine load increases gradually with an increase in displacement of the compressor.

As at the initial stage of operation of the compressor the load on the compressor is not so high, the unconditional activation of the fast idling device at this stage necessarily causes an undue rise in engine speed which results in a wasteful consumption of fuel. Further, in case of the motor vehicle equipped with an automatic transmission, there is a danger of abrupt starting due to such undue rise of engine speed.

SUMMARY OF THE INVENTION

It is accordingly an object of the present invention to prevent an undue increase in engine speed which would otherwise occur when a fast idling device is activated at the initial stage of operation of an automobile air-conditioner incorporating a variable displacement compressor, thereby obviating the possible danger of abrupt starting of a motor vehicle.

Another object of the present invention is to avoid a wasteful fuel consumption caused by an undue increase in idling engine speed, thereby saving energy consumption as a whole.

To achieve the foregoing objects, there is provided according to the present invention a control apparatus for an automobile air-conditioner, comprising: a variable displacement compressor driven by an engine and operative to vary its displacement gradually from a small displacement to a large displacement immediately after it is started; a fast idling device responsive to the start of operation of the variable displacement compressor and operative to increase the idling speed of the engine by a predetermined value; a pressure sensor for detecting a discharge pressure of the variable displacement compressor; and idling-up control means for retarding operation of the fast idling device until detection of a predetermined discharge pressure of the variable displacement compressor by the pressure sensor.

With this construction, even when an air-conditioner start switch is turned on, the operation of the fast idling device is retarded until a certain increase in load on the compressor is detected in the form of an increase in the discharge pressure of the compressor. This increase in load on the compressor cancels out an increase in rotational speed of the engine obtained by the fast idling device, so that an undue increase in engine speed can be avoided.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described herein below in greater detail with reference to a preferred embodiment illustrated in the accompanying drawings.

Figure 1:
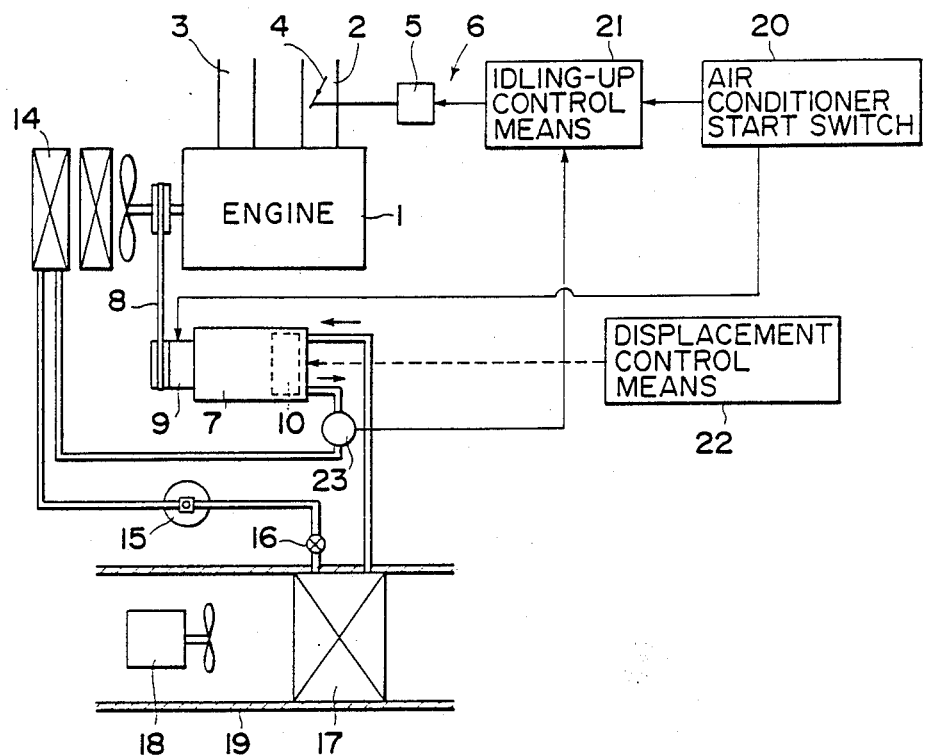
FIG. 1 is a schematic view showing the general construction of an automotible air-conditioner incorporating a control apparatus according to the present invention.

FIG. 1 shows an automobile air-conditioner incorporating a control apparatus embodying the present invention, the air-conditioner being driven by an engine 1 of a motor vehicle. The engine 1 includes an intake passage 2 through which a fuel-air mixture gas is introduced into the engine 1 for combustion therein. The combustion gas is then discharged from the engine 1 through a discharge passage 3 to thereby drive the engine 1. In the intake passage 2, there is disposed a carburetor (not shown) having a throttle valve 4 which is operatively connected to an accelerator pedal (not shown) of the motor vehicle. The throttle valve 4 is provided with a non-illustrated speeding-up or acceleration lever which is connected to a solenoid-operated actuator 5. The throttle valve 4 and the solenoid-operated actuator 5 constitute a fast idling device 6. The fast idling device 6 is operative to increase the rotational speed of the engine 1 while the engine 1 is idling.

The air-conditioner further includes a compressor 7 of a known construction, such, for example, as a sliding-vane rotary compressor or a wobble-plate compressor. The compressor 7 is drivingly connected with the engine 1 by an endless belt 8 and includes an electromagnetic clutch 9 which is actuated to selectively connect and disconnect the compressor 7 and the engine 1. The compressor 7 is also provided with a displacement adjustment device or mechanism 10 for adjustably varying the displacment of the compressor 7. The displacement adjustment device 10 is of the type such, for example, as shown in Japanese Patent Laid-open Publication No. 62-157291 in which an intake hole in the form of a cutaway recess is angularly moved to change the compression starting position or timing, thereby varying the discharge pressure of the compressor. Due to its construction, the compressor 7 is operative, under the control of the displacement adjustment device 10, to change its displacement from a small displacement to a large displacement when it is started. The compressor 7 of the foregoing construction further includes an externally disposed displacement control means 22 constructed to output control signals for varying the displacement of the compressor 7 from the small displacement to the large displacement according to a predetermined control flow.

In a wobble-plate compressor shown in Japanese Utility Model Laid-open Publication No. 62-119484, the displacement of the compressor is changed from a small displacement to a large displacement in response to a control output signal from a displacement control means (identical to the displacement control means 22) when the compressor is started.

The compressor 7 is connected in fluid communication with a condenser 14, a liquid tank 15, an expansion valve 16 and an evaporator 17 to constitute jointly therewith a closed refrigeration cycle. In the refrigeration cycle, the compressor 7 compresses a refrigerant gas which in turn is condensed by the condenser 14 into a vapor-liquid mixture gas. The vapor-liquid mixture gas is then fed into the liquid tank 15 where it is separated into the vapor phase and the liquid phase. The thus separated liquid refrigeration medium is thereafter choked by the expansion valve 16 and changed into a low temperature, low pressure wet vapor which in turn is fed into the evaporator 17 where it is evaporated. The thus evaporated refrigeration medium is returned to the compressor. The evaporator 17 is disposed in a case 19 of the air-conditioner together with a blower 18. Upon operation of the blower 18, the circulated air or the outside air is drawn into the air-conditioner case 19 and then cooled as it passes through the evaporator 17. The thus cooled air is blown-off into a passenger compartment of the motor vehicle.

The on-off control of the electromagnetic clutch 9 is started when an air-conditioner start switch 20 is actuated. In this instance, on-off signals of the air-conditioner start switch 20 are delivered to an idling-up control means 21. When the idling-up control means 21 is supplied with a signal representing the ON stage of the air-conditioner start switch 20, and also when the discharge pressure of the compressor 7 is higher than a predetermined value as described above, the actuator 5 of the fast idling device 6 is operated to thereby increase the engine speed while the engine 1 is idling.

Figure 2:
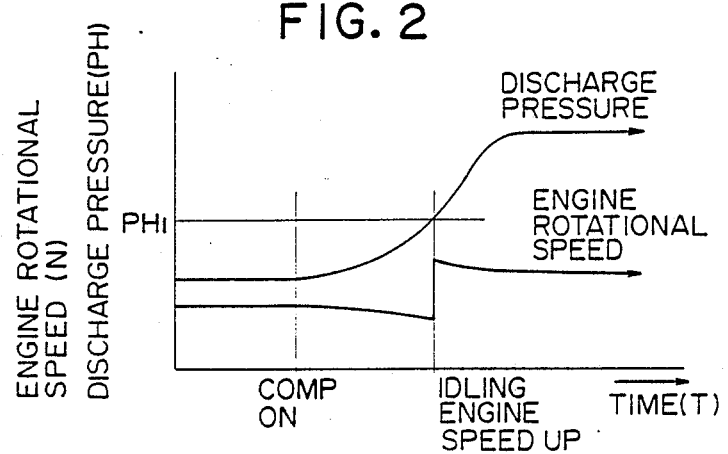
FIG. 2 is a graphic representation showing correlation between the performance curve of a compressor and the performance curve of an engine that are obtained under the operation of the control apparatus.

The idling-up control means 21 is constructed to receive an input signal representing the discharge pressure of the compressor 7 which is detected by a pressure sensor 23. Operation of the idling-up control means 21 is described below with reference to FIG. 2. After the air-conditioner start switch 20 is turned on, the discharge pressure (PH) of the compressor 7 is increased gradually. When the discharge pressure of the compressor reaches a predetermined value (PHl), the idling-up control means 21 issues a command signal to an actuator 5 of the fast idling device 6 to increase the idling engine speed by a predetermined value.

In this instance, the load on the compressor 7 (which is proportional to the discharge pressure of the compressor 7) increases to such an extent to accommodate the increase of the idling engine speed. As a result, an undue increase in engine speed can be avoided.

Obviously, various modifications and variations of the present invention are possible in the light of the above teaching. It is therefore to be understood that within the scope of the appended claims the invention may be practiced otherwise than as specifically described.

What is claimed is:

1. A control apparatus for an automobile air-conditioner, comprising:
    (a) a variable displacement compressor driven by an engine and operative to vary its displacement gradually from a small displacement to a large displacement immediately after it is started;
    (b) a fast idling device responsive to the start of operation of said variable displacement compressor and operative to increase the idling speed of said engine by a predetermined value;
    (c) a pressure sensor for detecting a discharge pressure of said variable displacement compressor; and
    (d) idling-up control means for retarding operation of said fast idling device until detection of a predetermined discharge pressure of said variable displacement compressor by said pressure sensor.

2. A control apparatus according to claim 1, said variable displacement compressor being operative to varying its displacement in response to an external control signal supplied thereto.

3. A control apparatus according to claim 2, said external signal being generated by a displacement control means disposed outside said compressor.

* * * * *